(Model.)

S. KINGSLAND.
MILK PAN.

No. 286,310. Patented Oct. 9, 1883.

Section at A-B.

Side Elevation.

Section at C-D.

Plan.

Witnesses:
A. M. Anderson
John Scholler

Inventor:
Samuel Kingsland
his mark

UNITED STATES PATENT OFFICE.

SAMUEL KINGSLAND, OF OMAHA, NEBRASKA.

MILK-PAN.

SPECIFICATION forming part of Letters Patent No. 286,310, dated October 9, 1883.

Application filed November 20, 1882. (Model.)

*To all whom it may concern:*

Be it known that I, SAMUEL KINGSLAND, of Omaha, in the county of Douglas and State of Nebraska, have invented certain new and useful Improvements in Milk-Pans, of which the following is a specification, reference being had to the accompanying drawings.

Figure 1:
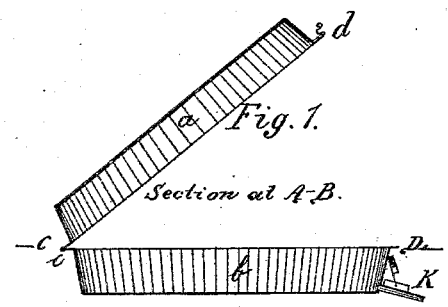
Figure 2:
Figure 3:
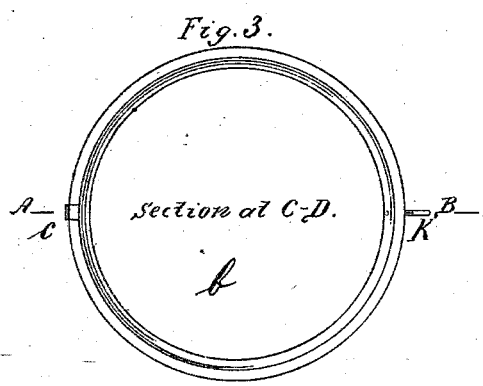
Figure 4:
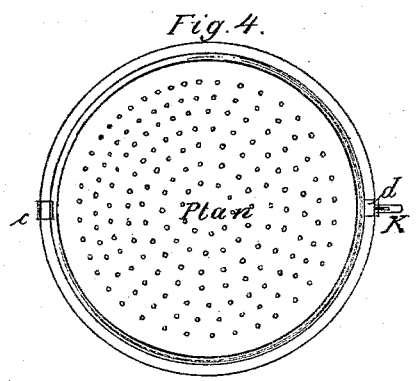
Figure 5:
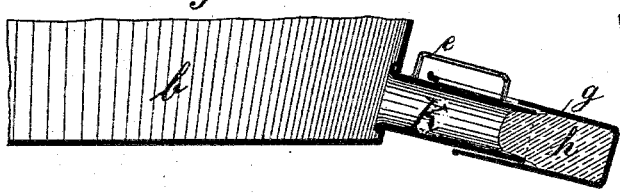
Figure 6:
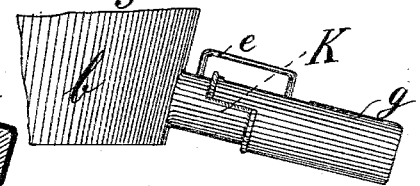

My invention consists in a novel construction of milk-pans, which will be fully understood by the following description and claim:

In the accompanying drawings, Figure 1 is a vertical section of my milk-pan on line A B, Fig. 3, with cover of the pan raised. Fig. 2 is a side view with the cover closed. Fig. 3 is a top view of the pan with the cover removed, being a section on line C D, Fig. 1. Fig. 4 is a top view of the perforated cover. Figs. 5 and 6 are details representing the spout, with stopper and cap thereof.

My improved milk-pan is made of sheet-tin or other suitable material, as shown at $b$ in the drawings. It is provided with a hinged perforated cover, $a$, which may be used for a colander or sieve, the chief object of the perforated cover being to admit air to the milk and exclude ants and other insects. The pan has an inclined spout, K, provided with a stopper, $h$, and cap $g$, which is slotted and attached to the spout by means of staple $e$, Fig. 5, so that the cap may be tilted up, as seen in Fig. 1. This construction of stopper and cap render the spout very secure from leakage, and the hinges $c$ and clasp $d$ hold the cover securely in place when closed. The inclined spout being near the bottom of the pan, the milk can be drained off without disturbing the cream.

I am aware that a wire-gauze cover, and also a conical perforated cover, have been used for milk-pans.

Having described my invention, what I claim is—

The described pan $b$, provided with the hinged perforated cover $a$, and the inclined spout K, having the stopper $h$ and slotted cap $g$, all constructed and arranged substantially as set forth.

his
SAMUEL  ×  KINGSLAND.
       mark.

Witnesses:
 E. F. SMYTHE,
 M. SHOLLER.